United States Patent [19]

Petersen

[11] 4,250,290

[45] Feb. 10, 1981

[54] PROCESS FOR THE CONTINUOUS MANUFACTURE OF SILOXANE POLYMERS

[75] Inventor: Louis P. Petersen, Schenectady, N.Y.

[73] Assignee: General Electric Company, Waterford, N.Y.

[21] Appl. No.: 49,524

[22] Filed: Jun. 18, 1979

[51] Int. Cl.³ .............................................. C08G 77/06
[52] U.S. Cl. ...................................... 528/14; 528/25; 528/37; 556/467
[58] Field of Search ............................ 528/37, 14, 25; 260/448.2 E; 556/467

[56] References Cited

U.S. PATENT DOCUMENTS

| | | | |
|---|---|---|---|
| 3,382,205 | 5/1968 | Beers | 260/37 |
| 3,779,987 | 12/1973 | Razzano | 528/37 |
| 3,903,047 | 9/1975 | Ashby | 528/10 |
| 3,978,104 | 8/1976 | Razzano | 528/37 |
| 4,128,568 | 12/1978 | Büchner et al. | 260/448.2 E |

*Primary Examiner*—Melvyn I. Marquis
*Attorney, Agent, or Firm*—Michael J. Doyle; John L. Young; E. Philip Koltos

[57] ABSTRACT

A process for the continuous manufacture of diorganopolysiloxane polymers. The polymerization reaction takes place in a static mixer wherein dimethyl cyclic polysiloxane monomers are treated with a potassium silanolate catalyst. Efficiency of the static mixer is maintained by the early introduction of water chain-stopper which effectively provides for a plug flow condition within the polymerizer section. Preparation of other polysiloxane fluids utilizing triorganosiloxy chainstopper is also disclosed.

17 Claims, 1 Drawing Figure

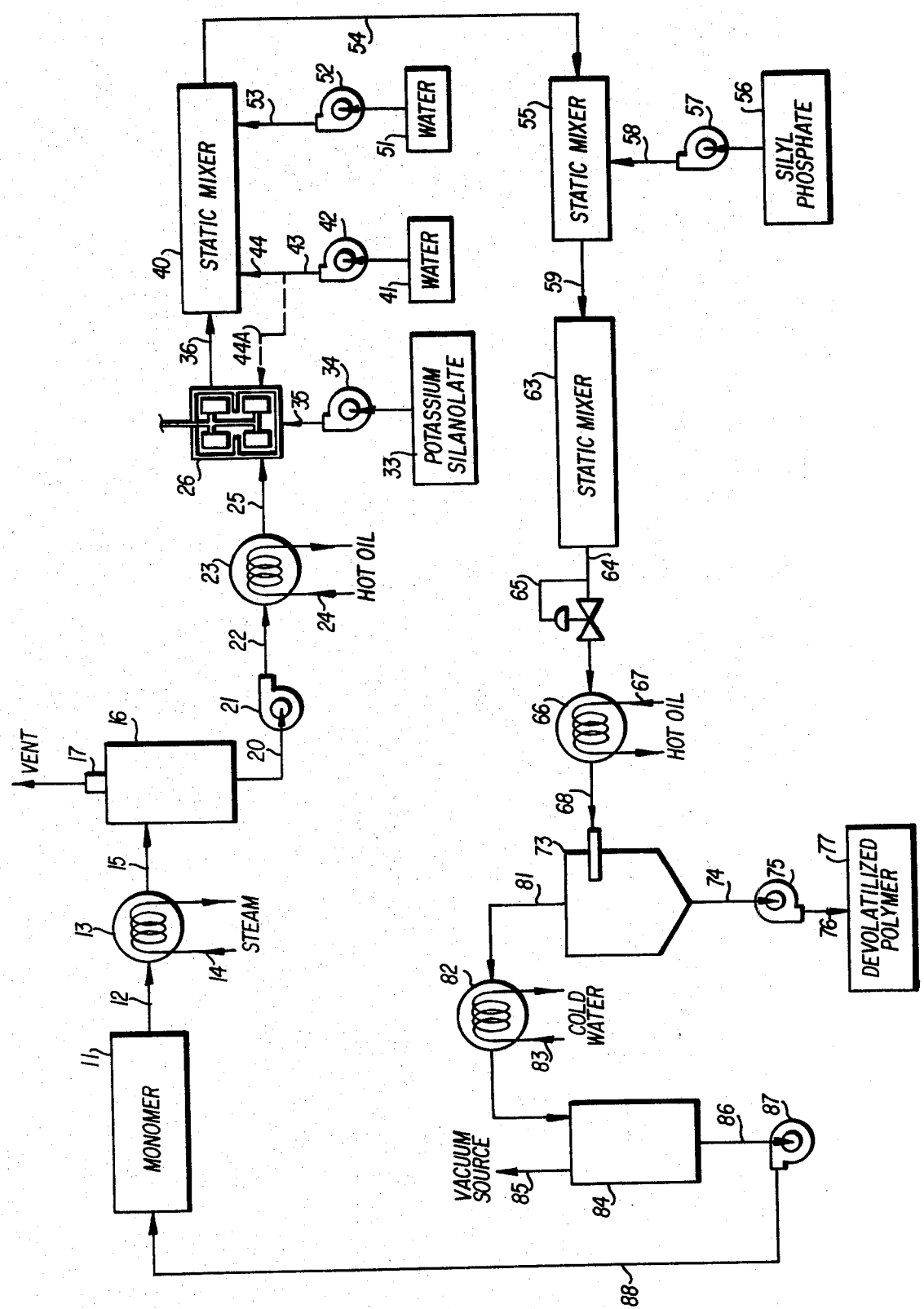

PROCESS FOR THE CONTINUOUS MANUFACTURE OF SILOXANE POLYMERS

BACKGROUND OF THE INVENTION

This invention relates to a process for continuously manufacturing diorganopolysiloxane polymeric materials wherein it is possible to control the efficiency of the process by the judicious application of an appropriate chainstopping agent. Siloxane polymers and copolymers have long been prepared by batch polymerization methods wherein siloxane monomers are catalyzed with acids or bases to produce polymers and copolymers having a wide range of average molecular weights. These polymeric products may be varied from low viscosity fluids to high viscosity gums.

The average molecular weight of the polymer may be controlled by the degree of polymerization and the addition of a chainstopping agent. As the polymerization reaction proceeds, monomers add to the end of the polymeric chain forming longer and longer polymers. The chainstopping agent halts the polymerization reaction and thereby limits the average molecular weight. The chainstopping agent may variously employ trialkylsiloxy-, alkoxy-, or silanol-groups or combinations thereof. The choice of chainstopper is made upon consideration of the end use of the polymeric product. For example, when water is used as a chainstopper, the diorganopolysiloxane polymer will terminate at each end with silanol groups (Si—OH). Furthermore, a silanol-stopped diorganopolysiloxane will have different properties than a polymer which is alkoxy- or trialkylsiloxy-stopped.

A typical polymeric product could be silanol-stopped dimethylpolysiloxane which has the following general formula:

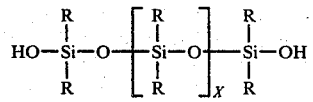

wherein R=lower saturated and unsaturated alkyl and aryl groups including methyl-, ethyl-, propyl-, vinyl-, phenyl-, etc. And wherein X=approximately 50 to approximately 2000.

Prior to the present invention, such a polysiloxane polymer was ordinarily prepared by batch processes as follows: Siloxane cyclic monomers such as dimethyl tetramer were charged to a polymerization vessel and dried by distillation or by refluxing the siloxane vapors through a molecular sieve column. The temperature of the dry monomers was then adjusted to about 155° C. and sufficient potassium hydroxide polymerization catalyst was added in the form of a ground slurry in methyl tetramer to give a potassium hydroxide concentration of approximately 20 ppm. The polymerization reaction was allowed to proceed with agitation until a highly viscous polymer was obtained, typically within 30±10 minutes. Then, water was added as a chainstopper to the polymer to restrict further viscosity increase and agitation was continued at about 155° C. Three more water additions were made at approximately 25 minute intervals, and agitation was continued for approximately 30 minutes after the last water addition.

The polymer was then sampled and tested for completion of the polymerization reaction and to determine the viscosity of the polymer. The potassium hydroxide catalyst was neutralized by adding an equal molar quantity of phosphoric acid and agitating for 1 to 1½ hours to complete the neutralization reaction. The polymer was again sampled and tested for acid/base concentration. Its stability to elevated temperatures was also tested.

Finally, the polymer could be stripped of unreacted monomers by distillation at pressures of 5 to 10 mm Hg and a temperature of approximately 160° C. The resultant silanol-stopped siloxane polymer made by the above reaction would have a viscosity of approximately 3500 cs at 25° C. and would contain less than approximately 2% unreacted monomer.

The production of large volumes of polymers by the above-described batch processing method is cumbersome and expensive and is subject to significant variations typical of batch processing.

Therefore, a primary object of the present invention is to provide a process for the continuous polymerization of diorganopolysiloxane polymers which overcomes the problems heretofore associated with the production of such polymers.

Another object of the present invention is to provide a process wherein the efficiency of the mixing elements is maintained by the predetermined and effective introduction of a chainstopping agent.

Still another object of the present invention is to provide a more efficient and less costly process for the continuous manufacture of siloxane polymers from cyclic polysiloxane monomers.

SUMMARY OF THE INVENTION

The present invention is directed toward a process for the continuous manufacture of polysiloxane polymeric products. Preheated and degassed monomeric starting material and the polymerization catalyst could be fed to a mechanical mixer to establish a uniform concentration of catalyst. The polymerization reaction, which starts immediately, could be carried out in any of several classical continuous reactor systems. Some examples of such continuous reactor systems are (1) a series of continuous stirred tank reactors; (2) a continuous mixer consisting of a long cylinder with mechanical agitation throughout its length; (3) a continuous cylindrical reactor in which mixing and converging are accomplished by one or more rotating screws; or (4) an open pipe continuous reactor. Each of these devices variously exhibit poor residence time distribution, required residence times in excess of the theoretical minimum, slow response to process variables, and elaborate and expensive construction. The shortcomings of an open pipe continuous reactor, for example, are discussed in detail below.

Therefore, in the present invention, the polymerization reaction is carried out in a static mixer which consists of a long pipe containing static mixing elements. Such a mixer allows plug-type flow, i.e., any portion of the reaction mixture entering the static mixer receives essentially the same residence time therein as any other portion of the composition. Other types of flow may exhibit disadvantageous fluid velocity profiles resulting in varying degrees of mixer residence time, inefficient mixing and non-uniform products. This plug flow condition ensures the production of a consistent and uniform product.

It has been found that is is also necessary to maintain the efficiency of a static mixer when one is used in place of a mechanical mixer. That is to say, plug flow must be substantially maintained within the static mixer. This object has been achieved in the present invention by the early introduction of a chainstopping agent. It has been discovered that the mixing efficiency of a static mixer is maintained by the introduction of an effective amount of chainstopping agent into what is essentially the beginning of the polymerization reaction zone, thus maintaining near plug flow conditions in the static mixer.

The present invention is also able to produce diorganopolysiloxane polymers on a continuous basis whereas previously such polymers were only available through batch processing which was, as described above, inherently cumbersome, inefficient and inconsistent.

The continuous polymerization process of the present invention can be carried out under a wide range of process variables. For example, the degassing temperature can range from, approximately, 120° to 173° C. and the polymerization temperature ranges from, approximately 150° to 210°°C.

The catalyst concentration can be from about 5 ppm to about 500 ppm of Equivalent KOH. The KOH equivalency of potassium silanolate ranges from, approximately, 0.05% to 6.0% KOH by weight; and the phosphoric acid equivalency of silyl phosphate ranges from, approximately, 1% to 20% $H_3PO_4$ by weight.

When water is selected as the chainstopping agent, the first water addition near the front of the polymerizer section will contain, aproximately, 50 to 500 ppm water as compared to the monomer. Subsequent water additions can total approximately 0 to 2500 ppm water, however, the water added at any single point along the polymerizer section should not exceed approximately 1000 ppm.

The monomer feed rate is determined by the amount of residence time required for polymerization as well as the volume of the polymerizer section.

Residence time required is determined by the desired degree of completion of the polymerization and the rate of polymerization (controlled primarily by temperature and secondarily by catalyst concentration). In typical practical application, the desired degree of polymerization completion is specified and a desired production rate is known. With this information, along with the knowledge of the volume of the polymerization section, the residence time can be calculated and a polymerization temperature and catalyst concentration selected within limits to produce the desired polymer. The relationship between polymerization completion and residence time is given by the 1st order reversible kinetic equation $\log (m-12)/(100-12) = -Kt$ where m=weight % monomer in polymer, K=polymerization rate constant (minutes $^{-1}$), and t=polymerization residence time (minutes). The value of K is determined by temperature and catalyst concentration. Good practice resulting in maximum performance is to select combinations of temperature and catalyst concentration such that at the residence time involved, active polymerization will be taking place over the entire length of the polymerizer section.

DESCRIPTION OF THE DRAWING

The accompanying drawing depicts, in schematic form, a flow diagram for the process of the present invention.

DESCRIPTION OF THE PREFERRED EMBODIMENT

Referring to the drawing, a starting material such as dimethylcyclic siloxane monomer 11 is introduced into the polymerization process through feedline 12 to a monomer preheater 13. The monomer preheater 13 raised the temperature of the monomers to at least 140° C. but maintains the temperature below the boiling point of the monomer. In one embodiment of the present invention, the monomer preheater utilizes steam 14 to heat the monomer.

The preheated monomers flow through feedline 15 to a degassing tank 16 which is a gas-liquid separating tank having a float controlled air valve 17 at the top for discharge of gases. At atmospheric pressure the preheated monomers are only partly degassed in this separating chamber, and leave the degassing tank through feedline 20.

A chemical proportioning pump 21 feeds the preheated degassing monomer through a feedline 22 at a constant adjustable rate. The pump discharge pressures are ordinarily approximately 170 to 200 psig.

The preheated partly degassed monomer is heated again by a second preheater 23. The second preheater 23 utilizes a hot oil 24 to heat the monomer to a temperature desired for the polymerizer stage.

From feedline 25 the monomer enters a two-stage mechanically driven in-line mixer 26 which has a volume of 0.25 gallons per stage. The hot monomer within the two-stage in-line mixer is mixed with a basic catalyst. For example, potassium silanolate catalyst 33 may enter the first stage of the in-line mixer 26 through feedline 35 at a constant adjustable rate which is controlled by a chemical proportioning pump 34. The use of a mechanical in-line mixer is a preferred but not essential item in the practice of the present invention, and serves the primary purpose of providing back-mixing at the start of the polymerization process so that the catalyst-monomer solution is of more uniform composition with time.

The hot catalyzed monomer passes through feedline 36 into a static mixer 40 which constitutes the reaction zone of the manufacturing process. In apparatus for practicing one embodiment of the present invention, the polymerization section consists of a 156 inch long pipe containing static mixer elements throughout its entire length and has a jacket containing recirculating hot oil for temperature control. Such a static mixer provides the plug flow required for the practice of the present invention so that essentially all elements of the hot catalyzed monomer have the same residence time within the static mixer.

A chemical proportioning pump 42 feeds the first water chainstopper 41 at a constant adjustable rate through feedline 43 to point 44 at the front section of polymerizer section 40. This early introduction of water chainstopper maintains the mixing efficiency of the static mixer even though the viscosity of the material within the static mixer reaction zone 40 is increasing with time. It should be noted, however, that water is used as a chainstopper when it is desired to produce a silanol-stopped polydiorganosiloxane polymer and that other chainstopping agents may be selected depending upon the desired end product.

Alternatively, the first water chainstopper 41 can be introduced earlier or later in the process. For example, the water chainstopper 41 could be introduced through feedline 44A into the first stage of the two-stage in-line mechanical mixer 26.

If additional chainstopping activity is necessary, a second chemical proportioning pump 52 is utilized for feeding the second water chainstopper 51 at a constant adjustable rate through feedline 53 into the polymerizer section 40. This is done at a point sufficiently upstream from the end of the polymerizer section to provide for complete mixing of the water with the polymer and which provides approximately at least two minutes additional residence time for reaction of the water into the polymer. Such an upstream point is indicated by feedline 53.

The polymer next passes through feedline 54 into a short length small diameter static mixer 55 wherein a neutralizing agent is introduced from a chemical proportioning pump 57 through feedline 58 into the small static mixer so as to neutralize the catalyst. When potassium silanolate is used as the catalyst, a suitable neutralizing agent is silyl phosphate 56. The small static mixer 55 provides for thorough mixing of the silyl phosphate neutralizer with the polymer. Note that the silyl phosphate neutralizer can be added at a controlled constant rate.

The neutralizing reaction takes place in a long pipe containing static mixer elements throughout its entire length. This static mixer 63 is the neutralization reaction zone and has a jacket containing recirculating hot oil for temperature control. Alternatively, static mixer 55 can be replaced with a mechanically driven in-line mixer at this point to eliminate the pressure drop characteristic of a static mixer and yet still provide for thorough mixing of the silyl phosphate neutralizer with the polymer.

The neutralized polymer leaves the neutralization zone through feedline 64 to a back pressure regulating valve 65 which is used to control the system pressure at approximately 170 psig.

A heat exchanger 66 heats the polymeric product. Circulating hot oil 67 may be utilized as the heat exchange medium and the heated polymer then leaves the heat exchanger through feedline 68. Note that instruments for indicating and/or controlling the temperatures, pressures and flow rates are appropriately used throughout the process.

The polymer is then passed into a liquid-vapor entrainment separator 73 wherein the neutral polymer is devolatized. Evaporation takes place within separator 73 and an absolute pressure of approximately 5–10 mm Hg is maintained therein. The devolatized polymer 77 is removed from the bottom of the vapor liquid separator through feedline 74 by a pump 75 whereupon the polymer product 77 exiting feedline 76 is ready for use or storage. Meanwhile, the monomer vapors are removed from the top of the separator through feedline 81 and condensed by a water-cooled condenser 82.

The monomer can be collected in a monomer surge tank 84 and can be removed through feedline 86 by monomer discharge pump 87. Preferably, the collected monomer can be recycled through feedline 88 for further use in the polymerization process.

Suitable monomeric starting materials can be any of several cyclic polysiloxanes. Although dimethyl tetramer (octamethylcyclotetrasiloxane) is a suitable choice, it is also possible to utilize pentamers, hexamers, heptamers, and equivalents as well as mixtures thereof. Note also that it is not essential for the production of diorganopolysiloxanes that the organic substituents be methyl radicals. Although methyl radicals are common substituents, other saturated and unsaturated alkyl and aryl substituents and mixtures thereof are suitable, depending on the intended use of the end product. Linear polysiloxane starting materials, however, are not ordinarily suitable for the practice of the present invention.

The continuous polymerization process of the present invention can be carried out as follows:

Dimethyl cyclic siloxane monomer is partially degassed by heating the monomer to a temperature of at least 140° C. but not higher than the boiling point of the monomer and the gases are separated from the monomer in a gas-liquid separating chamber at atmospheric pressure. The degassed monomers are then pumped at a desired constant rate through a heat exchanger in order to raise the temperature of the degassed monomers to a temperature which is compatible with residence time in the polymerization reactor. Suitable temperatures can be from approximately 160° C. to approximately 200° C.

The hot monomer is then mixed with a basic catalyst in a mechanically driven in-line mixer.

Suitable basic catalysts include cesium hydroxide, potassium hydroxide, sodium hydroxide, lithium hydroxide and their analogues cesium silanolate, potassium silanolate, sodium silanolate and lithium silanolate. These various catalyzing agents have different relative reactivities with respect to the present polymerization process and accordingly, compensation must be made for them. For example, sodium hydroxide is a weak base and will catalyze the polymerization relatively more slowly than the others, and therefore the reaction takes longer at any given temperature. On the other hand, cesium hydroxide reacts very quickly and may be less suitable for the reason that the polymerization reaction could run to completion before there is any opportunity to control the viscosity of the product or the efficiency of the process by the practice of the present invention. Thus, cesium hydroxide may be an effective catalyst when a strong base is required, as for example, when the temperature of the polymerization reaction zone is low.

It has been found that the preferred basic catalyst is potassium silanolate which is an active form of potassium hydroxide and which is also very soluble in a monomer solution such as octamethyltetrasiloxane. The relatively great solubility of this catalyst in the starting material is a very advantageous characteristic which greatly increases the efficiency of this continuous polymerization process. If a less soluble catalyst such as potassium hydroxide were utilized it would be necessary to provide an agitated chamber having sufficient residence time to dissolve the potassium hydroxide by reaction with the siloxane monomer to form potassium silanolate. In the practice of the present invention, it is preferred that the potassium silanolate be prepared beforehand in sufficient quantities that it may be continuously added to the polymerization process.

The potassium silanolate is pumped into the in-line mixer by a constant rate pump. As noted above, the in-line mixer is preferred but not essential and serves the primary purpose of providing back-mixing at the start of the process so that the catalyst monomer solution has a more uniformly consistent composition with time. A secondary benefit of the in-line mixer is to ensure rapid and uniform solution of the potassium silanolate catalyst in the monomer.

The hot catalyzed monomer is then passed into a static mixer which is kept at an essentially constant temperature of approximately 160° C. to approximately 200° C. and more preferably approximately 180° C. to approximately 190° C. A pressure slightly greater than the vapor pressure of water at the polymerization temperature is maintained within the static mixer. Typically, 170 psi gauge pressure for a polymerization temperature of 190° C. is suitable.

The volume of the static mixer is chosen so that sufficient residence time can be provided in order to obtain the desired degree of polymerization and so that the polymerization reaction can proceed continuously at a predetermined rate. Normal practice is to obtain a polymer containing less than 16% of the unreacted monomer. It is recognized, however, that when the monomer is dimethyl cyclic siloxane the equilibrium monomer content is approximately 12%.

It is essential that the polymerization section of the processor be a static mixer in order that plug flow is obtained. Plug flow means that each element of the fluid monomer entering the polymerizer section will have essentially the same residence time as any other element of the monomer. The use of a static mixer in the polymerization stage is particularly essential due to the rapid increase in viscosity with increasing degree of polymerization. For example, if a static mixer is not used, a polymerization section composed of an open pipe would exhibit the typical parabolic velocity profile of liquids flowing through pipes under laminar flow conditions. The liquid near the wall of the pipe would move at a lower velocity than the liquid in the center of the pipe, resulting in residence times varying according to radial position in the pipe. This variation of residence time would quickly result in the formation of a highly viscous polymer near the pipe wall moving at extremely low velocities and a stream of very low viscosity partly polymerized material flowing rapidly down the center of the pipe. Adverse effects of this situation are eliminated by installing the static mixer elements inside the pipe so that there exists constant radial mixing of the fluid. Thus, a substantially uniform velocity profile resulting in nearly constant residence times will be obtained.

The mixing efficiency of the static mixer is maintained by controlling the viscosity increase of the polymeric product. The viscosity is controlled by an early introduction of a chainstopping agent. For a silanol-stopped polymer, water chainstopper is pumped into the polymerizer at a rate such that a polymer of the desired average molecular weight and viscosity will be produced. It is essential for the practice of this continuous polymerization process that at least approximately 100 ppm water and not more than approximately 500 ppm water be added at the front section of the polymerizer to provide sufficient chainstopping activity to limit the viscosity of the polymer formed at this point and, more particularly, to limit the viscosity of polymer formed early in the polymerization process.

This early introduction of water chainstopper into the process is necessary due to the decreasing mixing efficiency of static mixers as the viscosity ratio of the materials being mixed increases. (The viscosity ratio is defined as: viscosity of the most viscous polymer/viscosity of unreacted monomer). For example, complete mixing of liquids at a 10,000 to 1 viscosity ratio requires a static mixer length equal to 8 to 12 diameters, whereas increasing the viscosity ratio to 1,000,000 to 1 increases static mixer length to 15 to 20 diameters. For purposes of the present invention, it is more relevant to recognize that as the viscosity ratio increases, the rate of mixing within the static mixer decreases. At the same time, there exists within the hydraulic channels of the static mixer, a fluid velocity profile whereby fluid in the center of the channel is moving at a relatively greater velocity than fluid adjacent to the wall, as described above for an open pipe reactor. The increased residence time of the fluid adjacent the walls of the hydraulic channels results in a higher degree of polymerization and increased viscosity which, in turn, further reduces velocity. Thus, a situation develops in which segregation into high and low viscosity polymerizing masses occurs at a rate higher than the rate of mixing by the static mixers. This segregation destroys the plug flow characteristic of the static mixer, creates channeling inside the polymerizer, and results in incomplete polymerization.

The above-described condition relating to the velocity profile of a fluid within the hydraulic channel of a static mixer is completely eliminated by the procedure of the present invention wherein sufficient water chainstopper is introduced into the process at essentially the start of the polymerization section in order to limit the viscosity of the polymer and to limit the viscosity range of polymer within the static mixer. Thus, the rate of mixing remains equal to or greater than the rate of segregation and plug flow conditions are maintained. The preferred location of water introduction is the inlet of the static mixer, but it may alternatively be added at the first or second stage of the in-line mixer or at any point before approximately the first 1/6 of the static mixer.

For the manufacture of polymers requiring more than the above 100 to 500 ppm water chainstopper, a second stream of water is later introduced at a controlled flow rate at a point sufficiently upstream from the end of the polymerizer section to provide for complete mixing of the water with the polymer plus approximately 2 minutes residence time for reaction of the water with the polymer. The viscosity of the silanol end-stopped polymer is controlled by the proportion of water to polymer, with the water proportion being the sum of the two streams.

The polymer next passes into a short length of small diameter static mixer wherein a suitable neutralizing agent is introduced.

The neutralizing agents utilized in practicing the present invention may be any mild acids effective for neutralizing the basic catalyst. Such neutralizing agents can include phosphoric acid, trischlorethylphosphite, or more preferably, silyl phosphate which is particularly effective because it is quite soluble in siloxane polymers and allows for rapid neutralization.

Silyl phosphate may be pumped into the static mixer to neutralize the potassium silanolate catalyst. A small diameter static mixer is employed at this point to provide thorough mixing of the silyl phosphate with the polymer. An alternate approach involves the use of a mechanically driven in-line mixer at this point to eliminate the pressure drop of a small static mixer. The flow rate of silyl phosphate is controlled so that the equivalent of approximately one mole equivalent of phosphoric acid is added for every mole equivalent potassium hydroxide in the polymer.

The polymer containing silyl phosphate neutralizer then enters a larger diameter static mixer which provides additional residence under plug flow conditions for completion of the reaction between the potassium silanolate catalyst and the silyl phosphate neutralizer.

The neutralized polymer is then discharged through a back-pressure regulating valve that controls the system pressure.

The neutral polymer is then devolatilized by passing through a preheater where heating and evaporation take place. The mixed liquid-vapor passes into a vapor-liquid entrainment separator maintained at an absolute pressure of 5 to 10 mm Hg. the devolatized polymer is removed from the bottom of the vapor-liquid separator by a pump while the monomer vapors are removed from the top of the separator, condensed by a water-cooled condenser and pumped out of the evaporator. The monomers, of course, may be collected in a suitable storage tank, or more preferably, recycled to the monomer feedline entering the polymerizer section.

In the following example, the potassium silanolate catalyst is a dimethylpolysiloxane containing potassium hydroxide in the form of potassium silanolate groups (Si—OK) and is a siloxane soluble potassium hydroxide catalyst. Workable and practicable potassium silanolate may contain up to approximately 5% by weight of equivalent potassium hydroxide.

The neutralizing agent, silyl phosphate, is a dimethylpolysiloxane containing phosphoric acid in the form of silyl phosphate groups and is a siloxane soluble form of phosphoric acid. In this example, silyl phosphate containing 12.0% of equivalent $H_3PO_4$ was prepared and then diluted for convenience to a 7:1 weight ratio with octomethylcyclotetrasiloxane to give a solution containing the equivalent of 1.50% by weight $H_3PO_4$.

The following examples are illustrative of a process for the continuous polymerization of silanol terminated diorganopolysiloxane polymers having a viscosity varying from 500 to 500,000 centipoise at 25° C.

EXAMPLE 1

The monomer preheater heated the monomer to a temperature of approximately 145° C. The chemical proportioning pump fed the monomer into the system at a pressure of approximately 170 to approximately 200 psig. The two-stage mechanically driven in-line mixer had a volume of 0.25 gallons per stage.

In this example, the polymerization section consisted of a 156 inch long pipe containing static mixer elements throughout its entire length. This polymerization section had an internal diameter of 3.26 inches. A suitable static mixer for the practice of the present invention and the one utilized with the present example is a type "BY" static mixer having a ¼ inch layer height which is manufactured by the Koch Engineering Company of Wichita, Kans. This static mixer had a jacket containing recirculating hot oil for temperature control.

The second static mixer was a 9¾ inch long by 1 inch diameter static mixer providing a ⅛ inch layer height such as a type "CY" static mixer manufactured by Koch Engineering.

The neutralizing section consists of a 3.26 inch internal diameter of 78 inch long pipe containing static mixer elements of the type described above for the polymerizing section. This neutralizing section also has a jacket containing recirculating hot oil for temperature control.

The back-pressure regulating valve controls the system pressure at about 170 psig.

Octomethylcyclotetrasiloxane monomer containing approximately 60 ppm water was polymerized to a silanol-stopped polymer under the following conditions:

| | |
|---|---|
| Monomer Feed Rate: | 110 lbs./hour |
| Degassing Temperature: | 155° C. |
| Feed Pump Pressure: | 174 ± 1 psig. |
| Preheat Temperature: | 207° C. |
| Potassium Silanolate Feed Rate: | 82.5 gms/hour |
| Equivalent KOH Concentration of Potassium Silanolate: | 1.93% by weight |
| First Water Feed Rate: | 12.7 ml/hour |
| Ratio of First Water to Monomer Content: | 254 ppm Water to Monomer |
| Second Water Feed Rate: | 37.6 ml/hour |
| Ratio of Second Water to Monomer: | 752 ppm Water to Monomer |
| Second Water Feed Location; | 52 inches from end of polymerizer section (feedline 53) |
| Silyl Phosphate Feed Rate: | 184 gms/hour |
| Equivalent $H_3PO_4$ Concentration of Silyl Phosphate: | 1.50% |
| Polymerizer Pressure: | 170 psig. |
| Measured KOH Concentration: | 28.5 ppm (sampled from end of polymerizer section) |
| Residence Time Within Polymerizer: | 17.8 minutes |
| Run Time: | 12 hours |
| Polymer Product: | |
| Residual Monomer Content: | 15.1% Average (13 samples; Range 14.1 to 16.0%) |
| Viscosity at 25° C. of Polymer Product: | 1798 cs (Avg of 13 samples ranging from 1460 cs to 2225cs) |
| Acid-Base Content: | 2 ppm base (equivalent KOH) to 2 ppm acid (equivalent HCl) |

EXAMPLE 2

The equipment used in this example was identical to that used in Example 1.

Octomethylcyclotetrasiloxane monomer containing approximately 50 ppm water was polymerized to a silanol-stopped polymer under the following conditions:

| | |
|---|---|
| Monomer Feed Rate: | 83.5 lbs./hr. |
| Degassing Temperature: | 155° C. |
| Feed Pump Pressure: | 180 psig. |
| Preheat Temperature: | 212° C. |
| Polymerizer Temperature: | 180.5° C. |
| Potassium Silanolate Feed Rate: | 70 gms./hour |
| Equivalent KOH Concentration of Potassium Silanolate: | 1.94% KOH by weight |
| First Water Feed Rate: | 16 ml/hour |
| Ratio First Water to Monomer: | 442 ppm water to monomer |
| First Water Feed Location: | Front face of static mixer |
| Second Water Feed Rate: | 0 - Second Water Unnecessary |
| Silyl Phosphate Feed Rate: | 144 gms./hour |
| Equivalent $H_3PO_4$ Concentration of Silyl Phosphate: | 1.50% |
| Polymerizer Pressure: | 170 psig. |
| Measured KOH Concentration: | 30 ppm (sampled from end of polymerization section) |
| Polymerization Residence Time: | 23.5 minutes |
| Run Time: | 60 minutes |
| Polymer Product: | |
| Residual Monomer Content: | 14.7% Average (5 samples; Range 13.2-16.2%) |
| Viscosity at 25° C.: | 10,700 cs (Avg of 5 samples ranging from 10,500 cs to 11,100cs) |

With only two modifications to the above-described procedure, the process of the instant invention is also useful for the preparation of triorganosilyldiorganopolysiloxane polymers having a viscosity from approximately 10 to approximately 1,000,000 centipoise at 25° C. which are chainstopped with triorganosiloxy groups. First, the cyclic siloxane monomer must be dried in order to avoid the formation of a silanol-stopped polymer. Second, the triorganosiloxy chainstopper should be in the form $R_3Si-[OR_2SI]_x-SiR_3$, where x is three or greater and R=monovalent hydrocarbon radicals. This second requirement is necessary so that the triorganosiloxy chainstopper will be incorporated into the polymer as rapidly as the diorganosiloxy monomer thus resulting in uniform chainstopping and a desirable molecular weight distribution in the finished polymer. Typically, trimethylsiloxy chainstoppers are suitable. It is required that all of this $R_3Si-[OR_2Si]_x-SiR_3$ chainstopper be fed into the two-stage mechanical in-line mixer (through feedline 44A). In all other respects, the procedures for producing a silanol-stopped diorganopolysiloxane polymer are followed.

EXAMPLE 3

The equipment used in this Example is identical to that used in Example 1.

Octamethylcyclotetrasiloxane monomer containing less than 20 ppm water is polymerized to a trimethylsiloxy-chainstopped polymer under the following conditions. The trimethylsiloxy chainstopper is provided by a siloxane polymer of the general formula, $$(CH_3)_3Si-[OSi(CH_3)_2]_n-Si(CH_3)_3$$

where n is substantially three (3) or more. A typical useful chainstopping polymer rich in trimethylsiloxy units is a mixture having the following composition:

| Value of n | Weight % | Value of n | Weight % |
|---|---|---|---|
| 0 | 0.1 | 5 | 13.2 |
| 1 | 0.7 | 6 | 5.1 |
| 2 | 3.9 | 7 | 1.6 |
| 3 | 41.7 | 8 | 0.5 |
| 4 | 27.9 | 9 | 0.2 |

This mixture contains approximately 35.9% by weight of trimethylsiloxy units. The balance of the mixture consists of cyclic polysiloxanes having 4 to 7 dimethylsiloxy units per cyclic molecule.

| | |
|---|---|
| Monomer Feed Rate: | 133 lbs./hour |
| Degassing Temperature: | 155° C. |
| Feed Pump Pressure: | 102 ± 1 psig |
| Preheat Temperature: | 205° C. |
| Polymerizer Temperature: | 190° C. |
| Potassium Silanolate Feed Rate: | 94 gms/hr. |
| Equivalent KOH Concentration of Potassium Silanolate: | 1.93% by weight |
| Rate of Chainstopper Feed: | 1.94 lbs/hr. |
| $(CH_3)_3 SiO_{\frac{1}{2}}$ Content of Chainstopper: | 35.9% |
| Location of Chainstopper Feed: | First Stage of in-line mixer (feed line 44A) |
| Silyl Phosphate Feed Rate: | 211 gms/hr. |
| Equivalent $H_3PO_4$ Concentration of silyl phosphate: | 1.50% |
| Polymerizer Pressure: | 100 psig |
| KOH Concentration: | 30 ppm |
| Residence Time within Polymerizer: | 14.7 minutes |
| Polymer Product | |
| Residual Monomer | 14% by weight |
| Viscosity at 25° C. | 2,100 centistokes |

It will be seen from the foregoing that the present invention provides a novel process for continuously manufacturing diorganopolysiloxane polymers.

This novel process results in a uniquely uniform polymeric product which has properties that exhibit a remarkable degree of consistency and ensures uniformity of performance unavailable to products made by prior art processes.

Additionally, the ability to produce a uniform product on a continuous basis results in a process which is more efficient than those of the prior art.

What is claimed as new and desired to be secured by Letters Patent of the United States is:

1. A process for the continuous polymerization of silanol terminated diorganopolysiloxane polymers having a viscosity varying from 500 to 500,000 centipoise at 25° C. comprising:
   (a) mixing degassed and preheated cyclopolysiloxanes with an amount of a basic catalyst effective for catalyzing said continuous polymerization;
   (b) passing the mixture of the polysiloxane and catalyst into a mixer having static elements which provide essentially uniform plug flow characteristics to the catalyzed mixture passing therethrough, maintained under pressure and providing sufficient residence time for completion of the polymerization and controlling the polymer viscosity by introducing to the initial part of the static mixer reaction zone from 100 to 500 parts per million of water as a chain-stopper;
   (c) mixing into the reaction mixer an amount of a neutralizing agent effective for neutralizing the basic catalyst; and
   (d) passing the solution of the neutralizing agent and reaction mixture through a mixer for completion of the neutralization.

2. A process as in claim 1, further comprising the step of adding up to approximately 2500 ppm additional water chain-stopper near the terminal end of the static mixer reaction zone to further control polymer viscosity.

3. A process as in claim 1, wherein the basic catalyst is selected from the group consisting of cesium hydroxide, potassium hydroxide, sodium hydroxide, cesium silanolate, potassium silanolate and sodium silanolate.

4. A process as in claim 3, wherein the basic catalyst is potassium silanolate.

5. A process as in claim 1, wherein the static mixer reaction zone is maintained at a pressure slightly greater than the vapor pressure of water at the reaction zone temperature.

6. A process as in claim 5, wherein the reaction zone pressure is at least 170 psig.

7. A process as in claim 1, wherein the static mixer reaction zone temperature is approximately 160° C. to approximately 200° C.

8. A process as in claim 7, wherein the preferred temperature is from approximately 180° C. to approximately 190° C.

9. A process as in claim 1, wherein the residence time of the hot catalyzed monomer within the static mixer reaction zone is sufficient to provide less than approximately 16% unreacted monomer after the polymerization reaction.

10. A process as in claim 1, wherein the neutralizing agents are silyl phosphite and trischloroethyl phosphiate.

11. A process as in claim 10, wherein the neutralizing agent is silyl phosphate.

12. A process as in claim 1, wherein one mole equivalent of neutralizing acid is added for each mole equivalent of catalytic base utilized in the polymerization reaction.

13. A process as in claim 1, wherein the neutralization reaction takes place in a static mixer providing sufficient residence time for completion of the neutralization reaction.

14. The process for the continuous polymerization of triorganosilyldiorganopolysiloxane polymers having a viscosity varying from 10 to 1,000,000 centipoise at 25° C. comprising:
(a) mixing dried degassed an preheated cyclopolysiloxanes with an amount of a basic catalyst effective for catalyzing said continuous polymerization;
(b) passing the mixture of the polysiloxane and catalyst into a mixer having static elements which provide essentially uniform plug flow characteristics to the catalyzed mixture passing therethrough, maintained under pressure and providing sufficient residence time for completion of the polymerization, and controlling the polymer viscosity by introducing to the initial part of the static mixer reaction zone a low molecular weight triorganosilyldiorganopolysiloxane as a chain-stopper, and where the organo group is a monovalent hydrogen radical;
(c) mixing into the reaction mixture an amount of a neutralizing agent effective to neutralize the basic catalyst and
(d) passing the solution of the neutralizing agent and reaction mixture through a static mixer for completion of the neutralization.

15. A process as in claim 14, wherein the basic catalyst is selected from the group consisting of cesium hydroxide, potassium hydroxide, sodium hydroxide, cesium silanolate, potassium silanolate and sodium silanolate.

16. A process as in claim 15, wherein the basic catalyst is potassium silanolate.

17. A process as in claim 15, wherein the triorganosilyldiorganopolysiloxane chainstopper has the general formula,

wherein n is a positive integer of approximately 3 or more.

* * * * *